United States Patent [19]

Burns

[11] Patent Number: 5,097,801
[45] Date of Patent: Mar. 24, 1992

[54] WASTE ENERGY HOT WATER HEATER

[76] Inventor: Daniel E. Burns, 307 Goose Creek Blvd., Goose Creek, S.C. 29445

[21] Appl. No.: 392,647

[22] Filed: Aug. 11, 1989

[51] Int. Cl.⁵ .................................... F22B 33/00
[52] U.S. Cl. .................................... 122/20 B; 122/421
[58] Field of Search ............... 122/20 B, 135.2, 155.2, 122/421, 451.1

[56] References Cited

U.S. PATENT DOCUMENTS

| | | | |
|---|---|---|---|
| 1,098,902 | 6/1914 | Holden | 122/20 B |
| 1,550,318 | 8/1925 | Hofmann | 122/20 B |
| 1,885,267 | 11/1932 | Kalfus | 122/20 B |
| 2,236,170 | 3/1941 | Fjellman | 122/20 B |
| 3,991,821 | 11/1976 | Cook et al. | 122/20 B X |
| 4,090,474 | 5/1978 | Kauffmann | 122/20 B |
| 4,122,801 | 10/1978 | Burns | 122/421 X |
| 4,177,766 | 12/1979 | Richter | 122/20 B |
| 4,318,366 | 3/1982 | Tompkins | 122/20 B |
| 4,318,367 | 3/1982 | Antonucci | 122/20 B |
| 4,344,568 | 8/1982 | Stewart et al. | 122/20 B X |
| 4,374,506 | 2/1983 | Whalen | 122/20 B |
| 4,412,526 | 11/1983 | DeGrose | 122/20 B X |

FOREIGN PATENT DOCUMENTS

| | | | |
|---|---|---|---|
| 332684 | 12/1935 | Italy | 122/20 B |
| 56150 | 4/1944 | Netherlands | 122/20 B |
| 8400193 | 1/1987 | PCT Int'l Appl. | 122/20 B |

Primary Examiner—Henry A. Bennett
Assistant Examiner—Christopher B. Kilner
Attorney, Agent, or Firm—Daniel E. Burns

[57] ABSTRACT

A waste energy hot water heater which extracts heat energy through heat exchange with flue gas from a primary heating device is disclosed. The water heater has an easily removable, compact, and simple heat exchanger and a flue gas bypass system to avoid overheating the heat exchanger.

2 Claims, 6 Drawing Sheets

WASTE ENERGY HOT WATER HEATER

BACKGROUND OF THE INVENTION

1. Field of the Invention.

This invention relates to the recovery of large quantities of heat which are the product of a primary heating device or furnace, such as used in domestic residential, commercial, and industry systems.

2. There have been many attempts of extracting and trying to recover and use waste or exhaust heat sources, but somehow the art of simplicity, compactness, efficiencies, safeties of overheating, easy access for serviceability and adaptability to multiple uses was lost in the process of development. The prior waste energy hotwater heater U.S. Pat. No. 4,177,766 had the compactness and efficiencies but lacked in all of the others.

SUMMARY

This unit in its simplicity in design is capable of successfully using the hot air exhaust of a furnace or device and is able to heat large amounts of water when connected to a primary hot water tank circulating the water from the tank through the unit and back to the water tank. It is the object of this invention over prior inventions is to incorporate adaptability, efficiency, compactness, simplicity, safety, and easy serviceability. A compact and efficient heat exchanger formed of spiral coils is removably mounted in an easily adaptable housing which includes a service door. Automatically controllable dampers inside the housing can deflect hot gases around the coils to prevent overheating.

DESCRIPTION OF THE PREFERRED EMBODIMENTS

Figure 1:
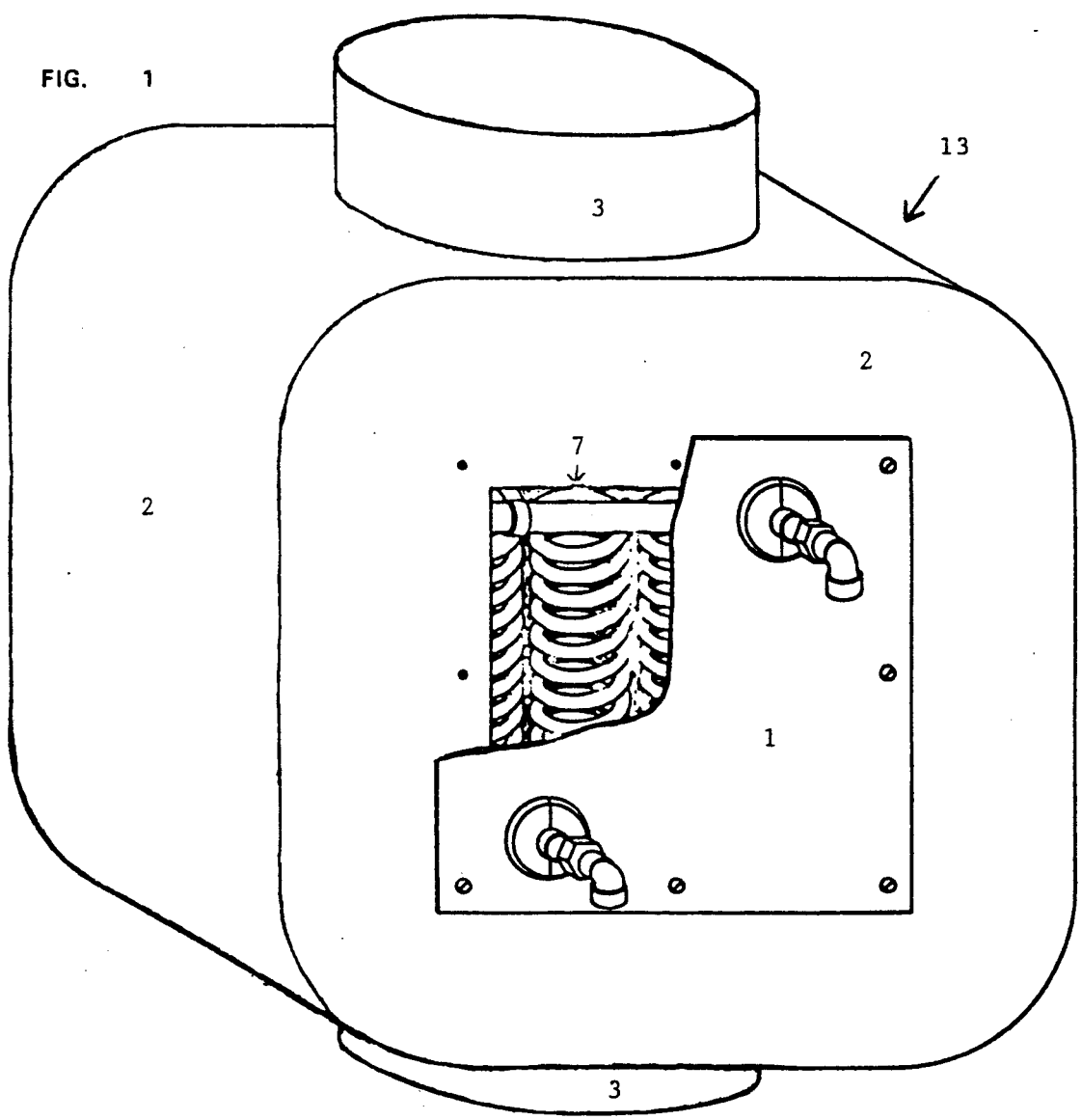
FIG. 1 shows a partial cutaway view of the waste energy hot water heater.

The waste energy hot water heater 13 is shown in FIG. 1 in an embodiment with access door 1 for heat exchanger 7 in housing 2, with flue inlet and outlet 3.

Figure 2:
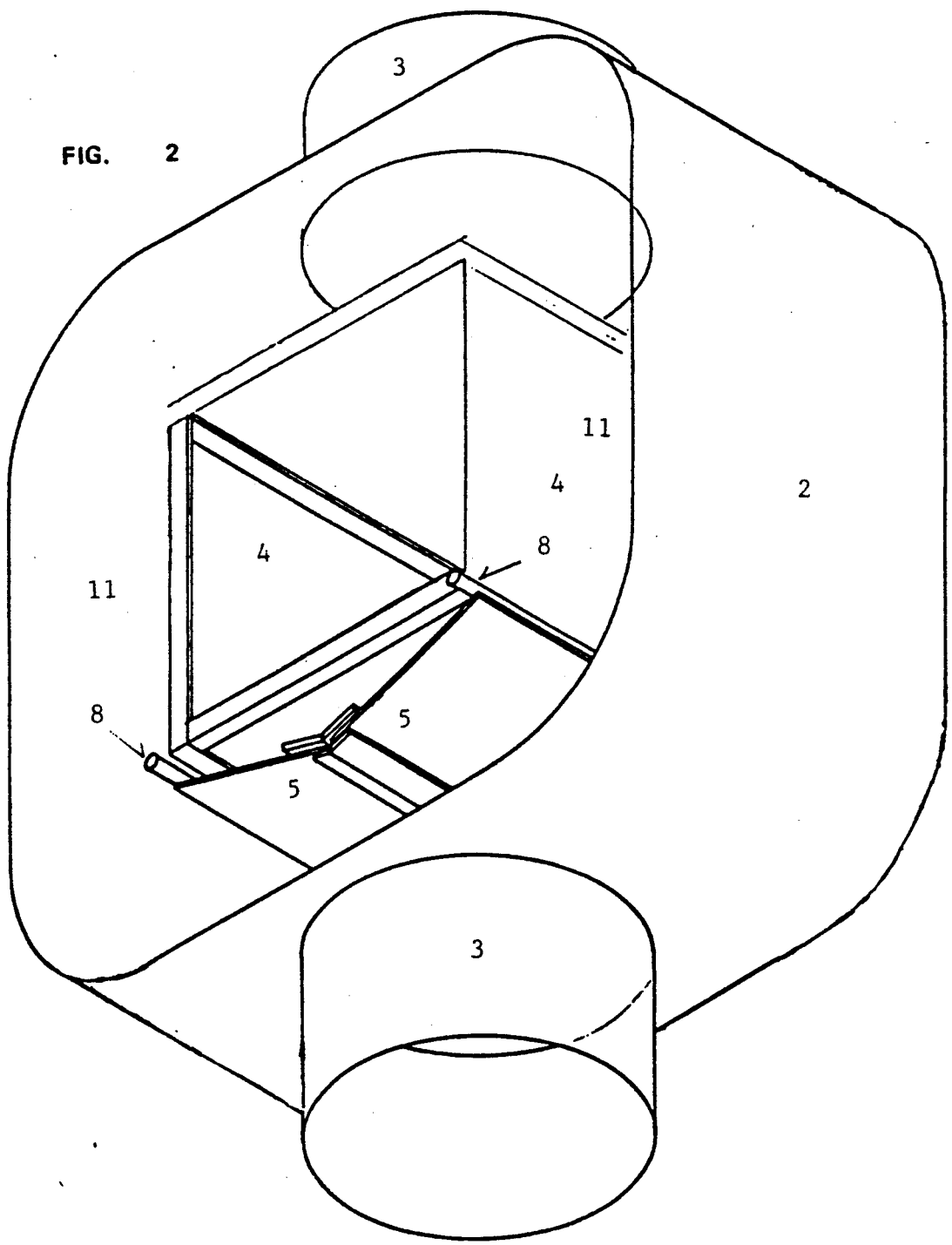
FIG. 2 shows a perspective view of the inner housing of FIG. 1.

Inside the housing there is a baffle means formed from side walls 4 and dampers 5 mounted on the bottom edge of walls 4 by hinge 8, as shown in FIG. 2. A bypass path 11 is formed between the housing and the baffle means.

Figure 3:
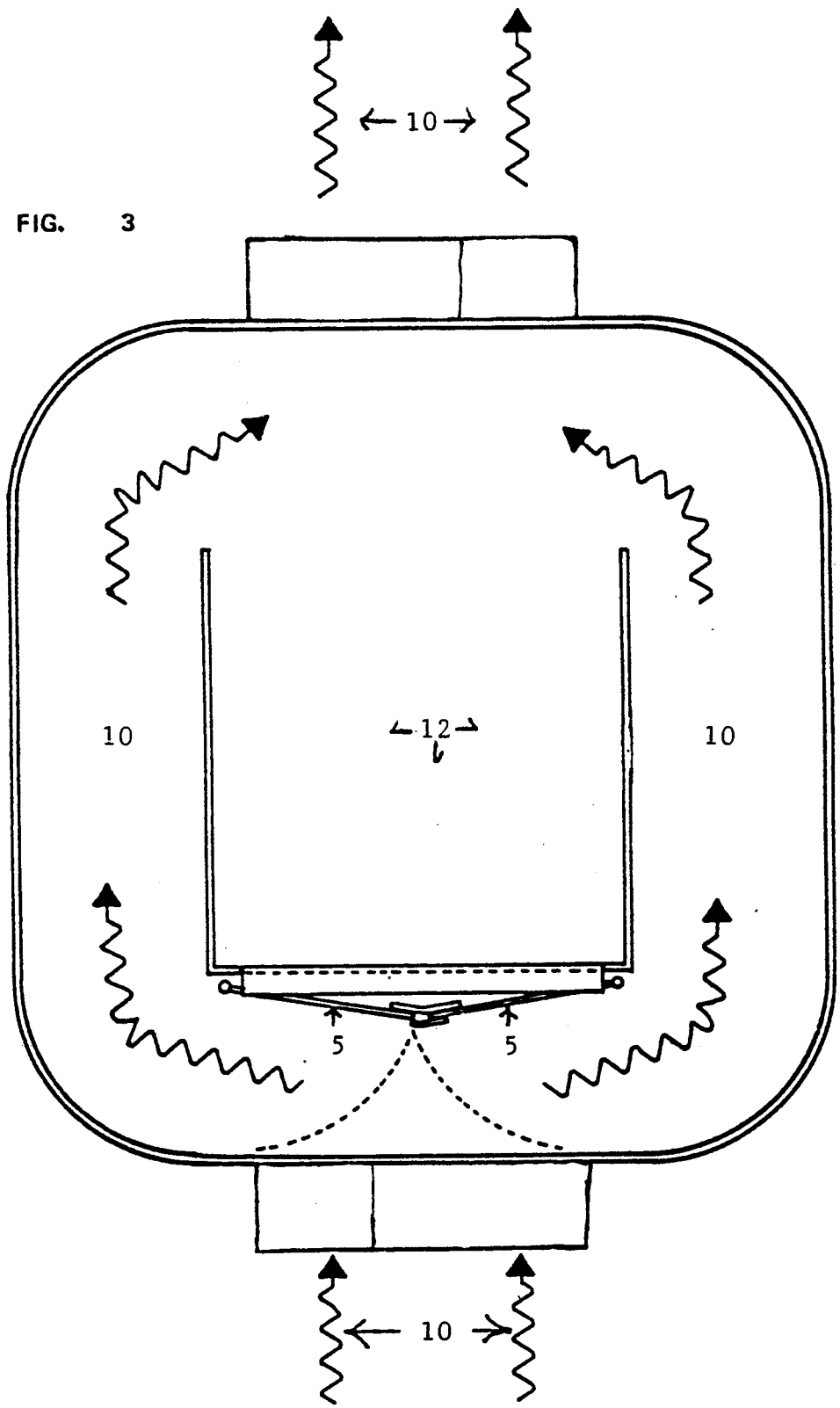
FIG. 3 is a cross section of FIG. 2 showing the hot gas flow pass with the dampers closed.

FIG. 3 shows the dampers 5 in a closed position which routes the flue gas 10 around the baffle means through bypass path 11 to bypass heat exchanger space 12.

Figure 4:
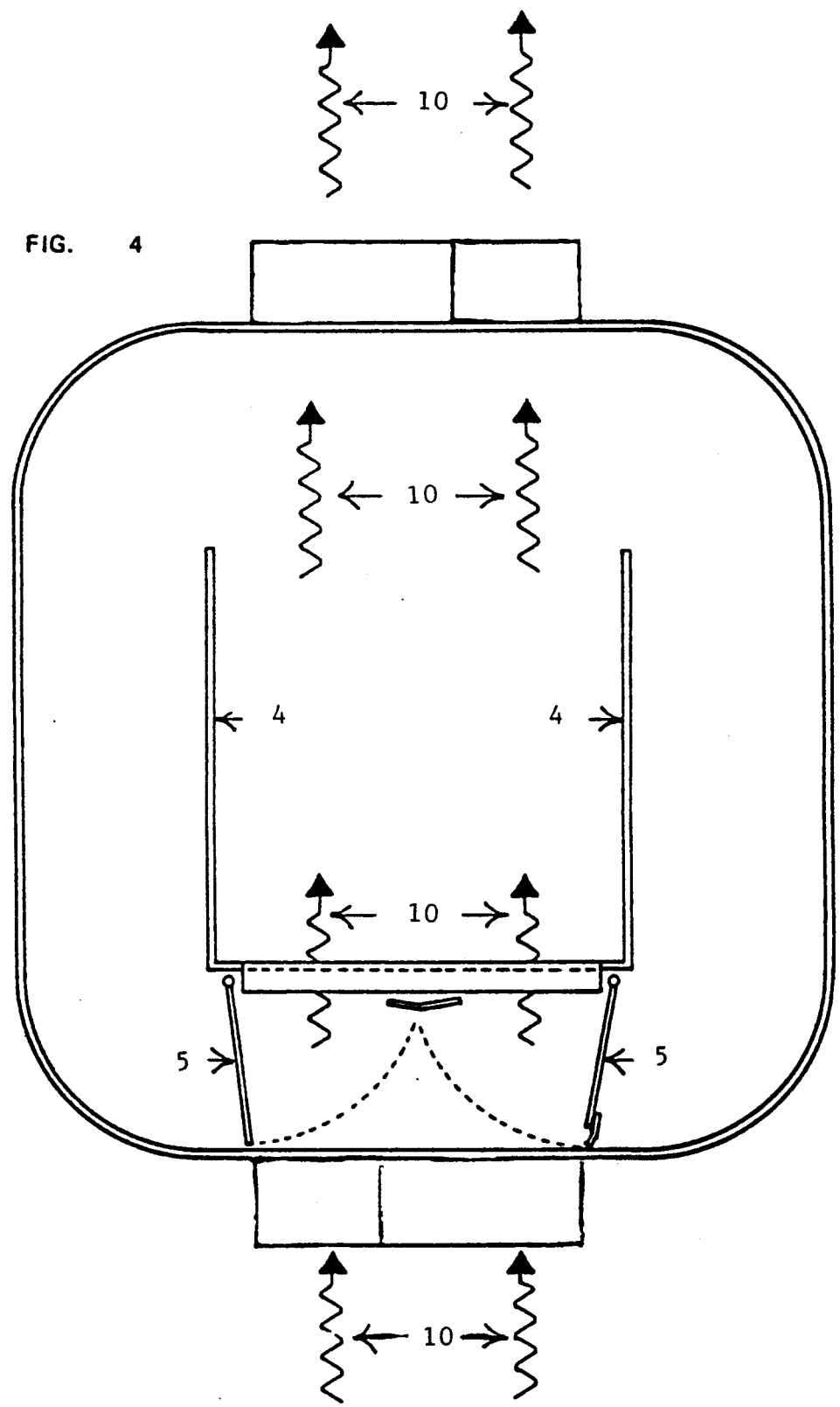
FIG. 4 is a cross section showing the hot gas pass with the dampers open.

FIG. 4 shows the dampers 5 in an open position wherein flue gas 10 passes between side walls 4 for heat exchange purposes.

Figure 5:
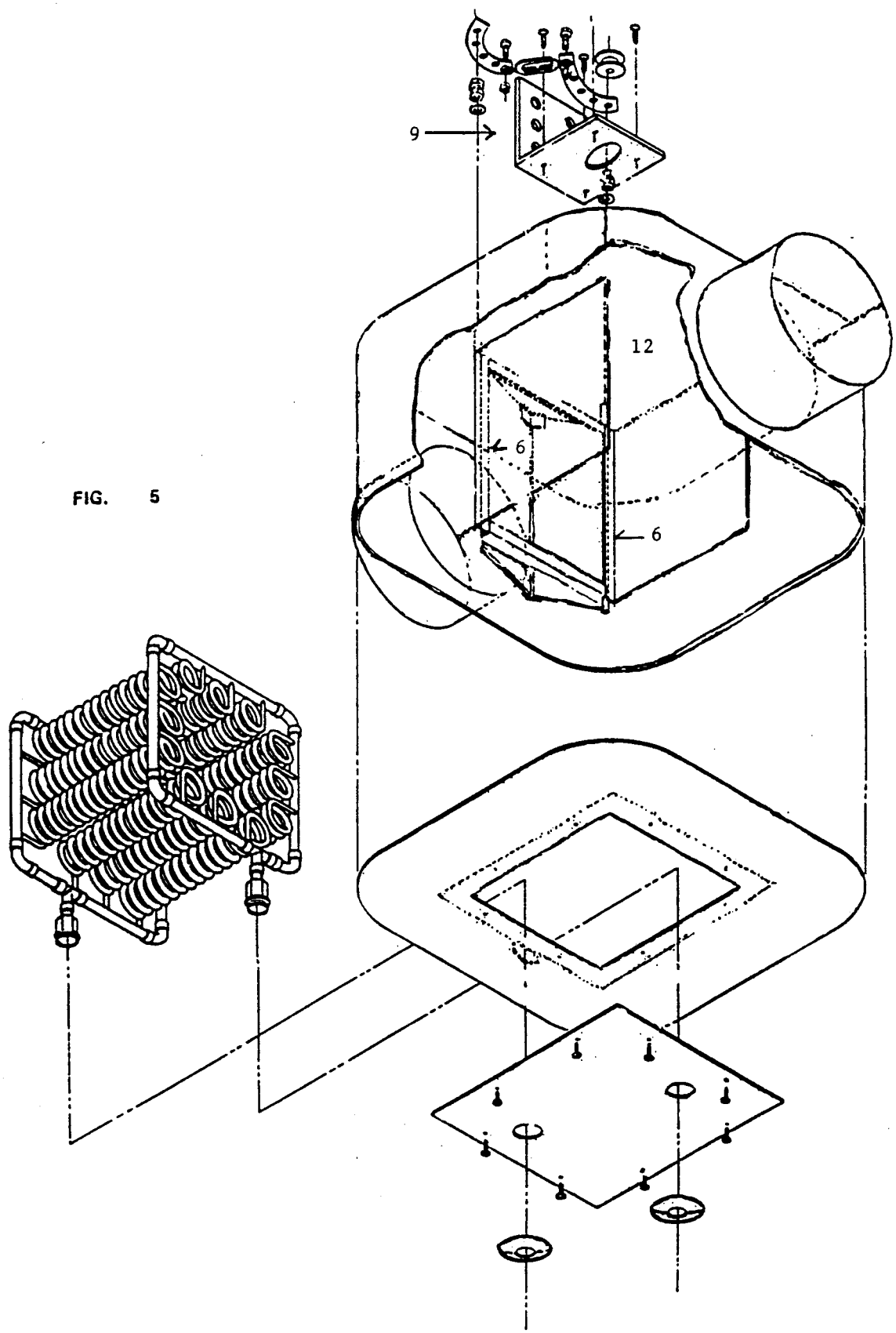
FIG. 5 is an exploded view of FIG. 1.

FIG. 5 shows operating means 9 for the dampers and rails 6 for supporting the heat exchanger in heat exchanger space 12.

Figure 6:
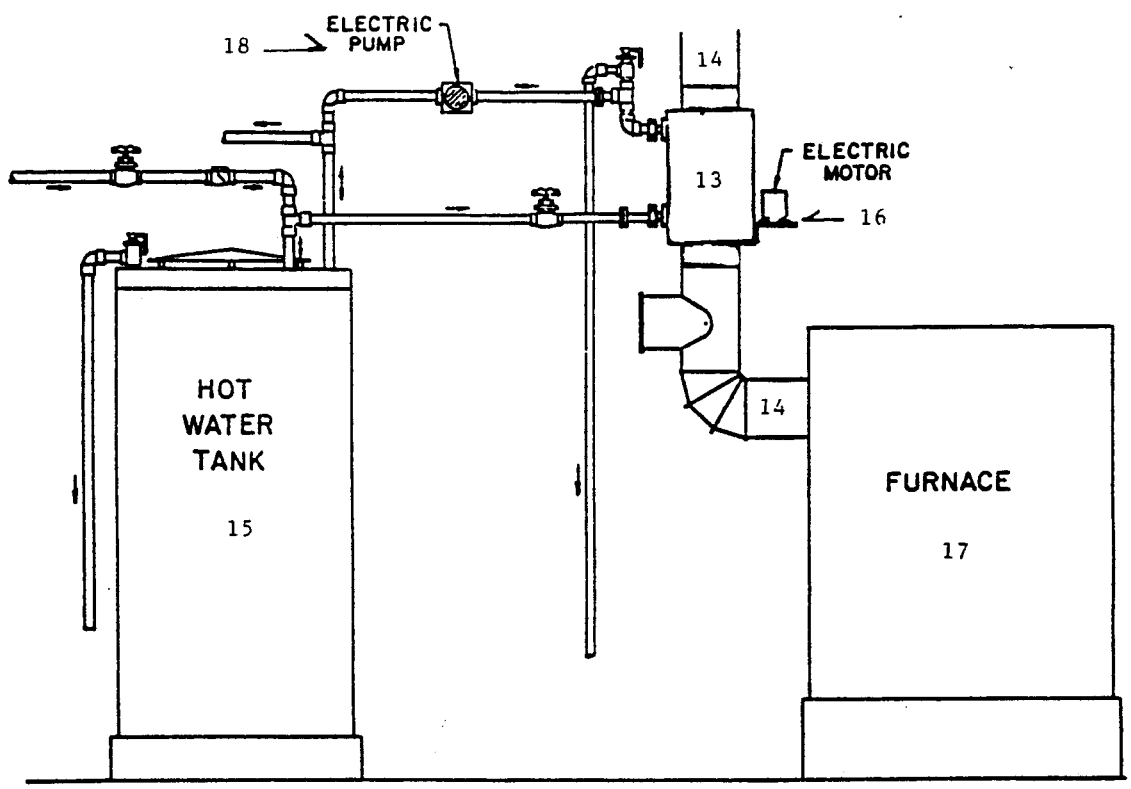
FIG. 6 shows a typical installation of the present invention.

FIG. 6 discloses a preferred installation of the waste energy hot water heater 13 in flue 14 of a primary heating device such as furnace 17. Electric motor 16 is the motive force for the dampers and operates in conjunction with electric pump 18 to supply heated water on demand to hot water tank 15.

I claim:

1. An apparatus for extracting waste heat from a primary heating device exhaust flue to heat water, said apparatus comprising:
   a) a housing comprising:
      i) rectangular front and rear panels,
      ii) top, bottom, and side panels joined between the front and rear panels to form an enclosure,
      iii) a flue inlet aperture in the bottom panel,
      iv) a flue outlet aperture in the top panel, and
      v) a rectangular access opening in the front panel;
   b) a heat exchanger sized to fit through the access opening, said heat exchanger comprising:
      i) inlet and outlet headers, each formed with front, rear, and side conduits into a square shape, and
      ii) a plurality of spiral shaped heat exchange coils extending between the inlet and outlet headers to form a flow path for water to be heated;
   c) an access panel for covering the access opening, including:
      i) a water inlet means for supplying water to the inlet header,
      ii) a water outlet means for transporting heated water from the outlet header, and
      iii) means for removably attaching the access panel to the front panel of the housing;
   d) a baffle means mounted between the front and rear panels of the housing and sized to encompass the heat exchanger, said baffle means comprising:
      i) two side walls adjacent the heat exchanger and spaced apart from the bottom, top, and side panels of the housing to form a bypass path for flue gas,
      ii) rail means extending inward at the base of the side walls for supporting the heat exchanger, and
      iii) two dampers hingedly mounted adjacent a bottom edge of the side walls, said dampers sized to form a closure between the side walls and prevent flue gas flow across the heat exchanger while directing flue gas through said bypass path when in a closed position and to direct flue gas across said heat exchanger when in an open position; and
   e) operating means for moving the dampers in response to hot water demand.

2. The apparatus of claim 1 wherein said front and rear panels have curved corner sections to promote gas flow through the bypass path.

* * * * *